(12) United States Patent
Perlo et al.

(10) Patent No.: US 9,567,053 B2
(45) Date of Patent: Feb. 14, 2017

(54) OUTBOARD PROPULSION SYSTEM FOR VESSELS

(71) Applicant: P-GEVS S.R.L., Rivoli (TO) (IT)

(72) Inventors: Pietro Perlo, Rivoli (IT); Pietro Guerrieri, Rivoli (IT)

(73) Assignee: P-GEVS S.R.L., Rivoli (TO) (IT)

( * ) Notice: Subject to any disclaimer, the term of this patent is extended or adjusted under 35 U.S.C. 154(b) by 0 days.

(21) Appl. No.: 14/761,387

(22) PCT Filed: Jan. 14, 2014

(86) PCT No.: PCT/IB2014/058249
§ 371 (c)(1),
(2) Date: Jul. 16, 2015

(87) PCT Pub. No.: WO2014/111844
PCT Pub. Date: Jul. 24, 2014

(65) Prior Publication Data
US 2015/0367926 A1 Dec. 24, 2015

(30) Foreign Application Priority Data
Jan. 18, 2013 (IT) .............................. TO2013A0045

(51) Int. Cl.
*B60L 11/00* (2006.01)
*B63H 21/17* (2006.01)
(Continued)

(52) U.S. Cl.
CPC .............. *B63H 20/32* (2013.01); *B63B 39/08* (2013.01); *B63H 20/00* (2013.01); *B63H 20/08* (2013.01);
(Continued)

(58) Field of Classification Search
CPC ......... B63H 20/32; B63H 20/08; B63H 21/17; B63H 2020/005; B63H 2021/17; B54C 29/0008
(Continued)

(56) References Cited

U.S. PATENT DOCUMENTS 3,914,629 A 10/1975 Gardiner
5,078,628 A * 1/1992 Garis, Jr. ................. B63H 5/14
114/20.2

(Continued)

FOREIGN PATENT DOCUMENTS

EP 1 885 047 B1 2/2008
EP 2 246 252 A2 11/2010
(Continued)

OTHER PUBLICATIONS

Italian Search Report dated Oct. 9, 2013, issued in Italian Application No. TO2013A000045, filed Jan. 18, 2013.
(Continued)

*Primary Examiner* — Daniel V Venne
(74) *Attorney, Agent, or Firm* — Workman Nydegger

(57) ABSTRACT

An outboard propulsion system for vessels includes a supporting structure (4) to be anchored to the transom wall (5) of the vessel and a plurality of propellers (3) carried by the supporting structure (4). Each propeller (3) is associated to an electric motor (6) with a toroid geometry, having an annular rotor (R) rotatable within an annular stator (S) and defining therewithin a central aperture (A), with the blades (3A) of the propeller (3) which are carried by the rotor (R) and extend to the central aperture (A).

13 Claims, 11 Drawing Sheets

(51) Int. Cl.
*B63H 20/32* (2006.01)
*B63H 25/42* (2006.01)
*B63B 39/08* (2006.01)
*B63H 20/00* (2006.01)
*B63H 20/08* (2006.01)
*B64C 29/00* (2006.01)
*B63H 1/16* (2006.01)
*B63H 23/00* (2006.01)

(52) U.S. Cl.
CPC .............. *B63H 21/17* (2013.01); *B63H 25/42* (2013.01); *B64C 29/0008* (2013.01); *B63H 2001/165* (2013.01); *B63H 2020/005* (2013.01); *B63H 2023/005* (2013.01)

(58) Field of Classification Search
USPC ............................................................ 440/6
See application file for complete search history.

(56) References Cited

U.S. PATENT DOCUMENTS

| | | | |
|---|---|---|---|
| 5,306,183 A * | 4/1994 | Holt | B63H 5/14 310/114 |
| 5,722,864 A * | 3/1998 | Andiarena | B63H 11/08 440/5 |
| 7,592,712 B2 | 9/2009 | Perlo et al. | |
| 8,956,195 B2 * | 2/2015 | Suzuki | B63H 1/16 440/2 |
| 2003/0186601 A1 | 10/2003 | Collier | |
| 2009/0001731 A1 | 1/2009 | Perlo et al. | |
| 2011/0263165 A1 | 10/2011 | Rolla | |
| 2012/0148424 A1 | 6/2012 | Hopewell | |

FOREIGN PATENT DOCUMENTS

| | | |
|---|---|---|
| EP | 2 332 824 A1 | 6/2011 |
| EP | 2 591 993 A1 | 5/2013 |
| EP | 2 591 995 A1 | 5/2013 |
| FR | 2 839 266 A1 | 11/2003 |
| JP | S62 37296 A | 2/1987 |

OTHER PUBLICATIONS

International Search Report dated Apr. 23, 2014, issued in PCT Application No. PCT/IB2014/058249,filed Jan. 14, 2014.

* cited by examiner

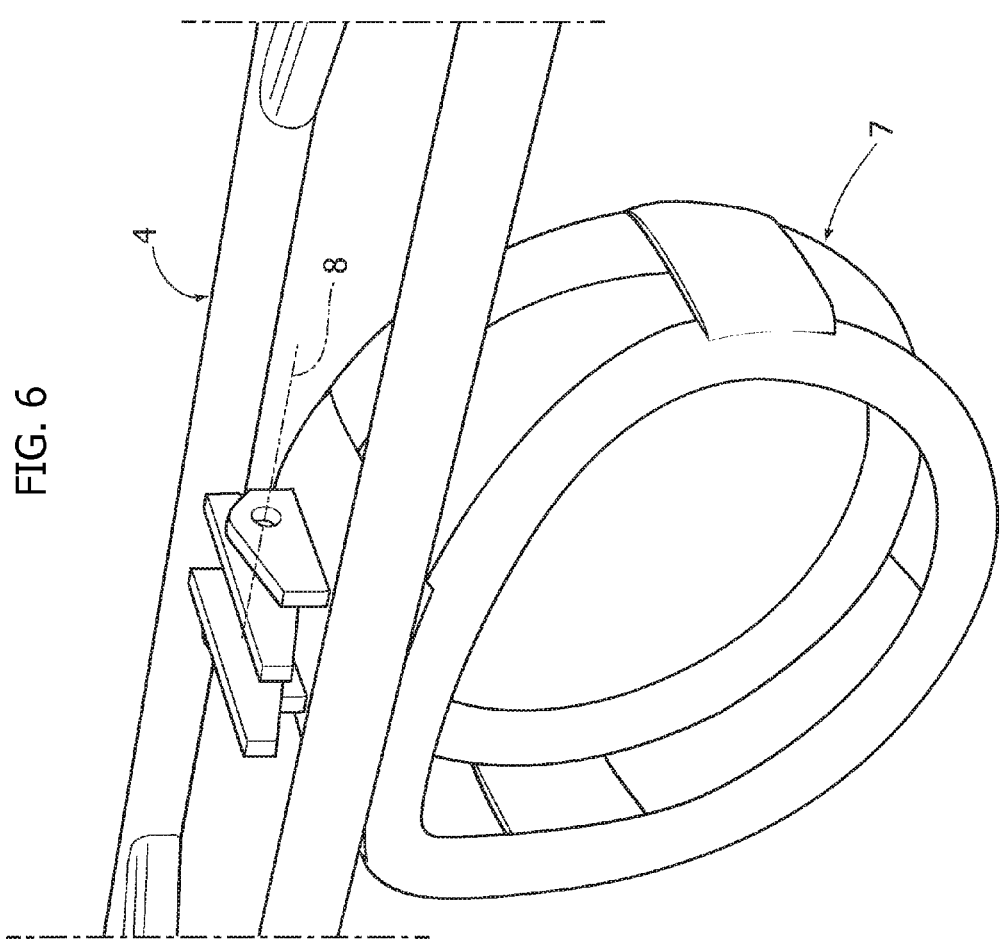

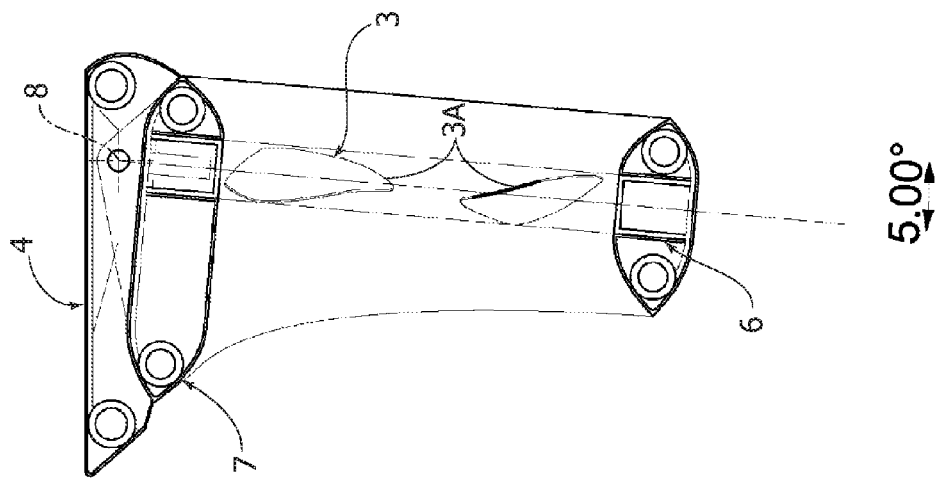
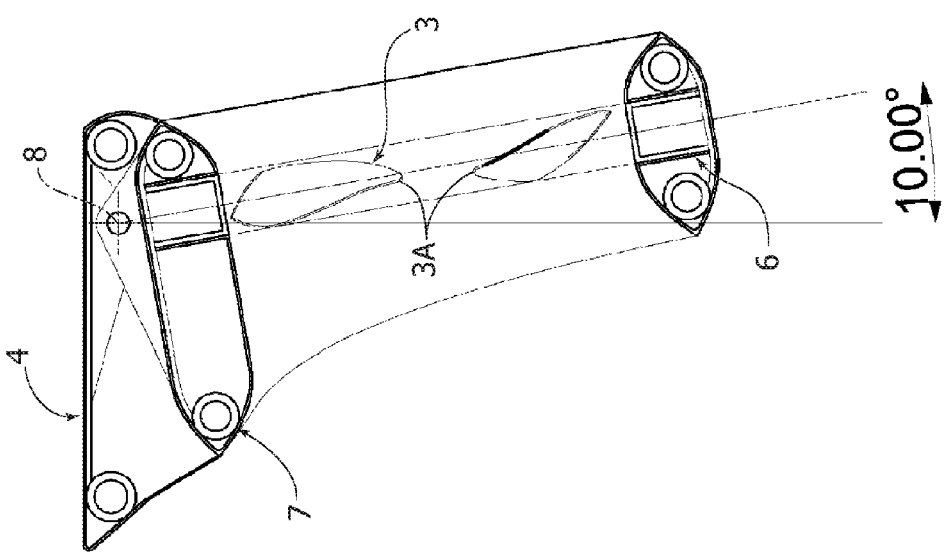

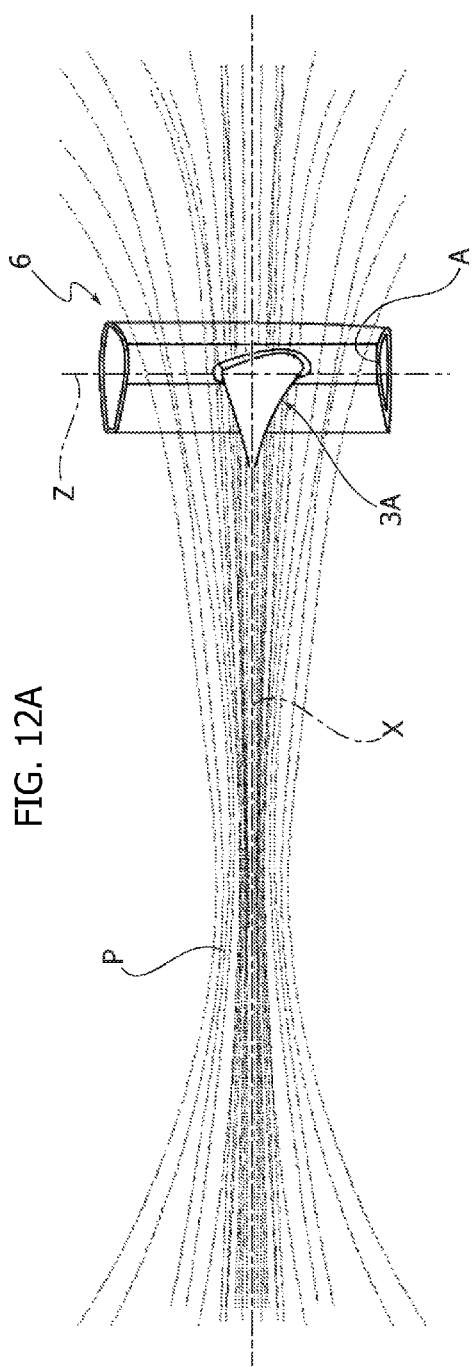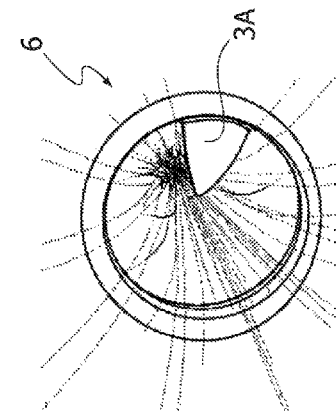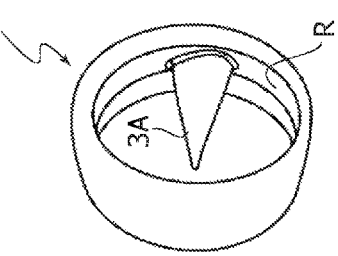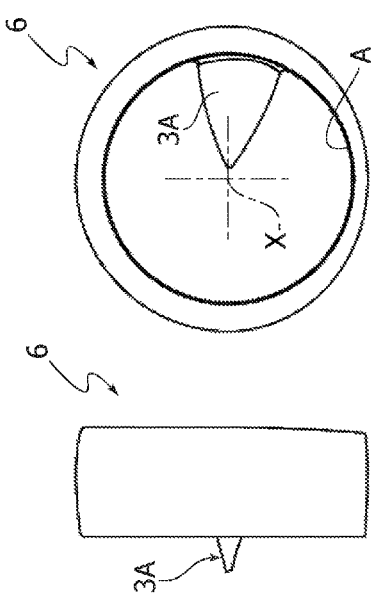
FIG. 12A
FIG. 12B
FIG. 12C
FIG. 12D
FIG. 12E

OUTBOARD PROPULSION SYSTEM FOR VESSELS

FIELD OF THE INVENTION

The present invention relates to the field of outboard propulsion systems for vessels, of the type comprising a supporting structure to be anchored to a transom wall of the vessel and at least one propeller carried by said supporting structure.

PRIOR ART

Document U.S. Pat. No. 3,914,629 A discloses an outboard propulsion system according to the preamble of claim 1. Marine propellers with an electric motor having a toroid configuration and radial blades which extend from the wall of the rotor into the central aperture of the rotor are known from US 2003/0186601 A1, EP 2 332 824 A1, EP 2 591 993 A1, EP 2 591 995 A1.

OBJECT OF THE INVENTION

The object of the invention is that of providing a system of this type which is characterized by high efficiency, lightness and reduced dimensions.

SUMMARY OF THE INVENTION

In view of achieving this object, the invention provides an outboard propulsion system for vessels comprising a supporting structure to be anchored to a transom wall of the vessel. One or more electric motors are supported by the support structure and have a toroid configuration, each of the one or more electric motors having an annular stator and an annular rotor rotatable within the annular stator, the annular rotor of each of the one or more electric motors encircling a central aperture. One or more propellers are provided with each of the one or more propellers being separately engaged with a corresponding one of the one or more electric motors, each of the one or more propellers having a central axis and one or more radial blades that are carried by the annular rotor of the corresponding one of the one or more electric motors and extend into the central aperture thereof, each of the one or more radial blades starting from a wall of the annular rotor and ending at a blade free end which is located at a distance from the central axis. The annular rotor and the annular stator of each of the one or more electric motors forms a guide tube through which a flow of water passes when the one or more electric motors are disposed within water and the one or more propellers are activated, the flow of water passing from in rear of to in front of each of the one or more propellers as the flow of water passes through the guide tube of each of the one or more electric motors. The configuration of the one or more radial blades of each of the one or more propellers is such as to cause the flow of water through the guide tube of each of the one or more electric motors to converge towards a focusing area located in rear of each of the one or more propellers.

Studies and tests of the Applicant have shown that due to these features and in particular due to the converging flow generated by the propeller, the propulsion thrust increases considerably with respect to the known solutions.

Preferably, the distance between said focusing area and the median plane of the propeller amounts to 1.8-2.2 times the inner diameter of said guiding tube at said median plane.

In one embodiment, each propeller comprises a single radial blade. Contrary to what one could think, the propulsion efficiency of a propeller with a single blade which is rotated at high speed is greater than that of a propeller with more blades, in which the hydrodynamic field of one blade is disturbed by that of the other blades. The potential drawback of a propeller with a single blade is that it is dynamically unbalanced, but this drawback has no detrimental consequences in the case of the invention, since the propeller is integrated within a motor with a toroid configuration, whose structure supports the centrifugal forces.

According to a preferred embodiment of the invention, the converging flow downstream of each propeller is obtained due to that each of said one or more radial blades has a curved tip oriented towards said focusing area and having a configuration such as to generate the required degree of convergence.

Electric machines adapted to be employed in the propulsion system according to the invention have been developed in recent years for use as motors or generators. A particularly interesting solution for the invention is that disclosed in European Patent EP 1 885 047 B1 and corresponding U.S. Pat. No. 7,592,712 B2 of the same present inventor.

In the preferred embodiment, the stator of the motor includes an annular core of ferromagnetic material having an alternated arrangement of slots and teeth for receiving the stator windings, and the rotor has an annular core of ferromagnetic material and an annular arrangement of permanent magnets arranged radially on the outside of said core, so as to define a plurality of magnetic North-South poles adapted to cooperate with the stator windings.

In one variant, the toroid electric motor is provided with windings and permanent magnets arranged only along a portion, such as 70%, of the entire circumferential extension of the toroid motor, so that at the remaining portion of the circumferential extension of the motor, the stator and the rotor can be made with a reduced dimension in the direction parallel to the motor axis, to advantage of a lower hydrodynamic drag.

According to a further preferred feature of the invention, the structure supporting all the propellers, or each propeller, is pivotally mounted around a horizontal axis transverse with respect to the direction of movement and actuating means are provided for adjusting the position of this supporting structure around said transverse axis, so as to keep the direction of the propeller thrust substantially parallel to the horizontal direction of movement.

Preferably, said actuating means comprise an electric actuator and an electronic control unit for driving the electrical actuator on the basis of the output signal from a sensor detecting the vessel attitude, such as an inertial sensor.

According to a further embodiment, which however does not form part of the annexed claims, a propulsion unit of the above indicated type can be used also for aerial propulsion in small unmanned aircrafts of the Vertical Take-off and Landing (VTOL) type, which can be used for example as drones equipped with a camera or a video camera for surveillance activities or for conveying small payloads. A vehicle of this type can be equipped for example with three or more propulsion units with vertical axes arranged around a central supporting structure, which for example can house an onboard electronic unit and transmitting/receiving means for communication with a control station. The configuration of each propulsion unit is identical to that described above for the outboard propeller device, with the difference that in this case the optimal configuration of the blades of the propellers is that which causes the air flow through each rotor to converge into a focusing area arranged at a distance which is 2.8-3.2 times the inner diameter of the rotor. Due to this feature, an aerial propulsion unit according to this embodiment has a greater efficiency and provides a greater lift with respect to the conventional solutions in the field of aerial propulsion for VTOL aircrafts. The known solutions of VTOL aircrafts with three, four or more rotors, both in the version with free rotors and in the version with ducted rotors, are penalized by an excessive aerodynamic drag due to the edge effects on the conventional blades and on the body of the motor, which is arranged at the centre of each rotor. For a given surface covered by the rotors, the losses increase with the number of rotors and with decreasing values of the diameters of the rotors. The higher efficiency and the control on the convergence of the flow through the annular rotors proposed according to this embodiment enable a greater fuel range of the aircraft. The annular rotor according to this embodiment is further characterized by a reduction of the aerodynamic noise, which in conventional rotors is caused by the turbulence originated by the edge effects on the conventional blades.

BRIEF DESCRIPTION OF THE DRAWINGS

Further features and advantages of the invention will become apparent from the following description with reference to the annexed drawings, given purely by way of non limiting example, in which:

FIG. 6 is a perspective view of the supporting structure only.

DETAILED DESCRIPTION OF PREFERRED EMBODIMENTS

Figure 1:
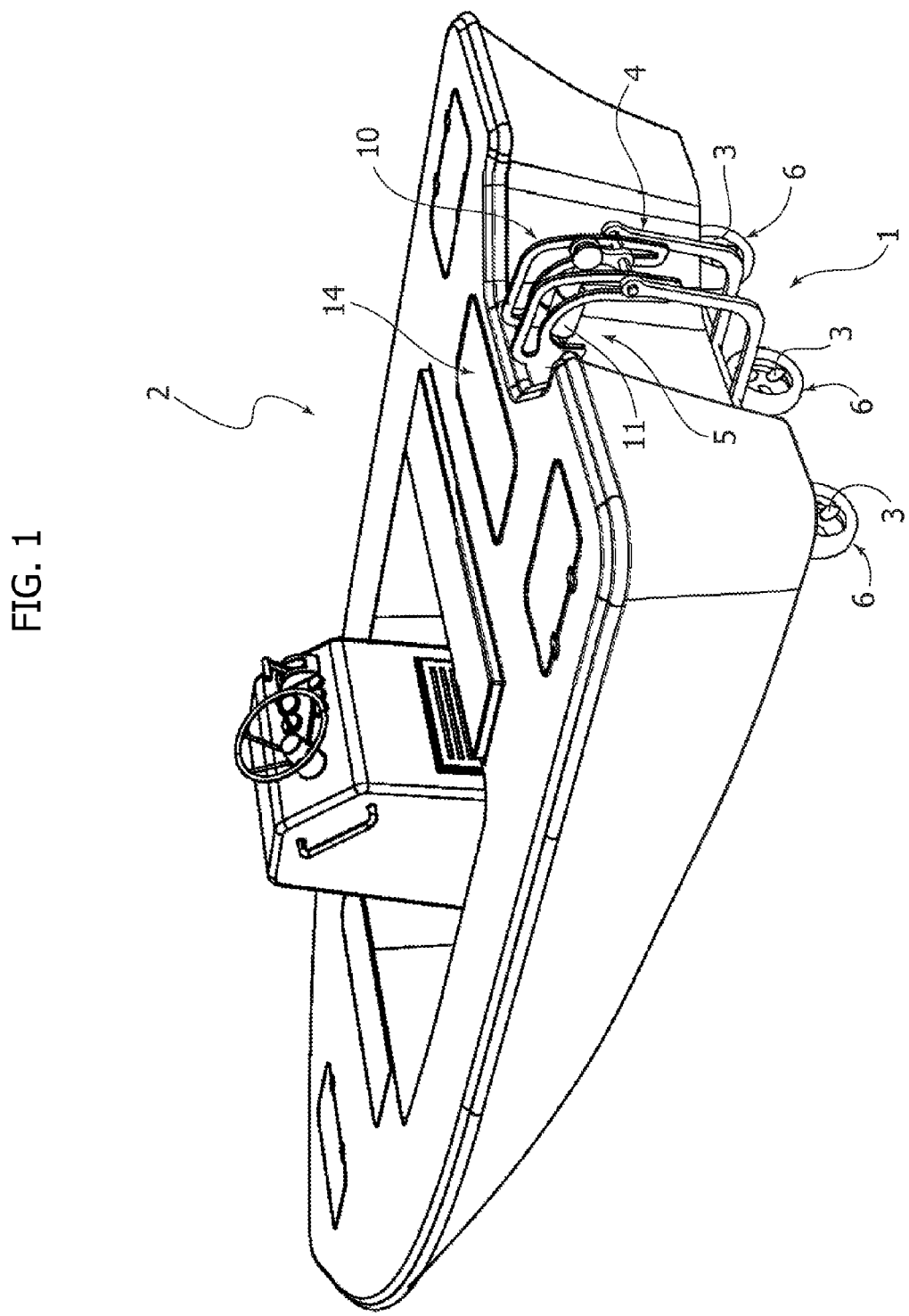
FIG. 1 is a perspective view of one example of a vessel to which an outboard propulsion system according to the invention is applied.

In FIG. 1, numeral 1 generally designates an outboard propulsion system for a vessel 2. It must be noted that the specific type of vessel shown in the drawings is given here purely by way of non-limiting example, while it is clearly apparent from the following description that the propulsion system according to the invention is applicable to an unlimited number of different types of vessel, as well as also to submarine vessels.

Figure 2:
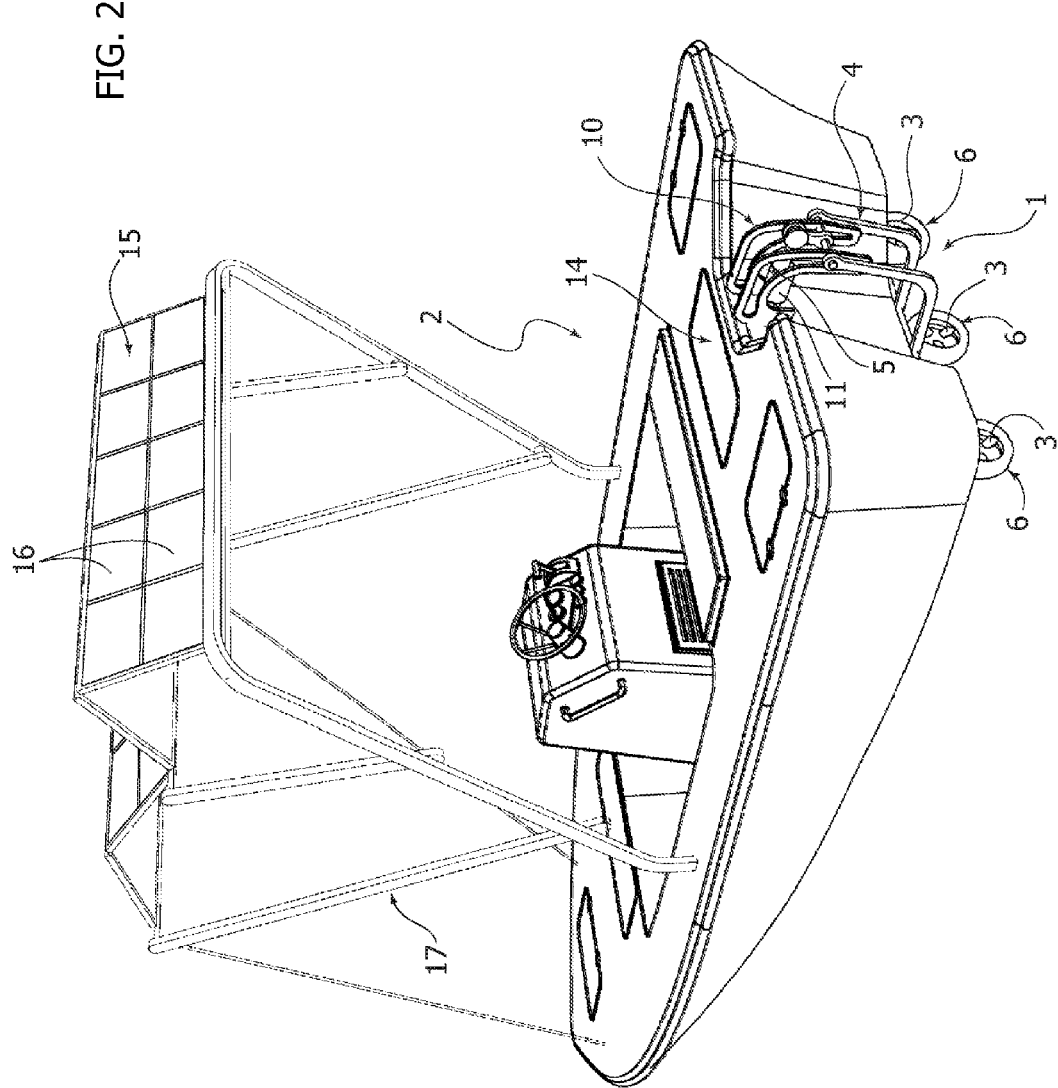
FIG. 2 shows the vessel of FIG. 1 with a foldable roof structure, carrying an array of solar cells, and illustrated in the deploying stage.
Figure 3:
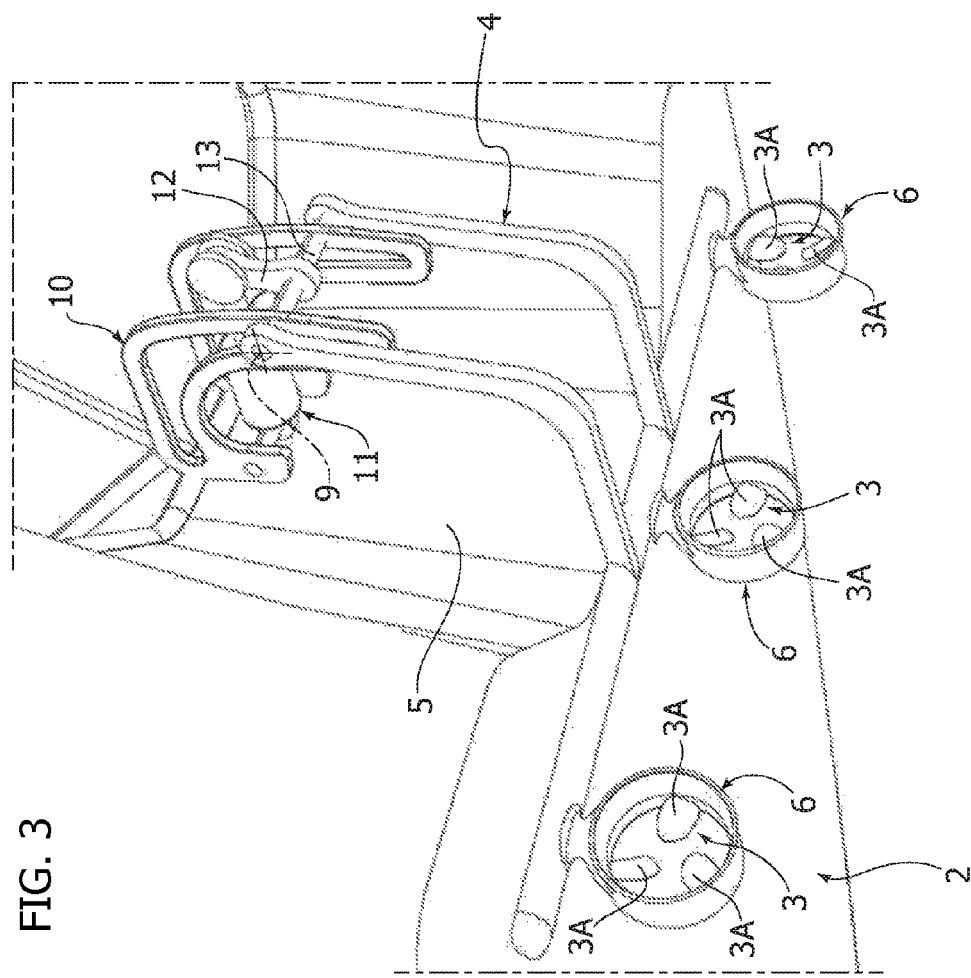
FIG. 3 is a perspective view at an enlarged scale of the propulsion system according to the invention.

With reference also to FIGS. 2, 3, the propulsion 1 comprises a plurality of propellers 3 (in the specific case which is illustrated herein there are provided three propellers) carried by a supporting frame 4 provided with anchoring means of any known type, for anchoring to the transom wall 5 of the vessel 2.

Figure 4:
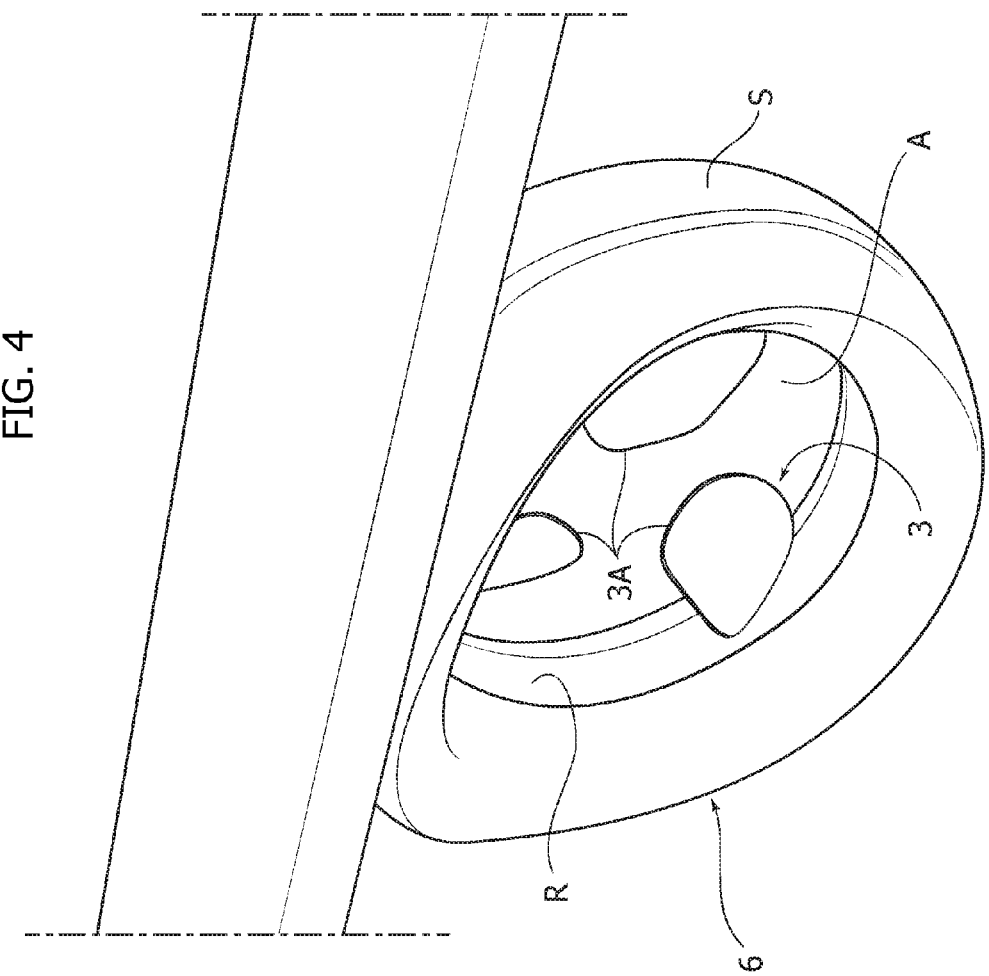
FIG. 4 is a perspective view at an enlarged scale of the detail of a single propeller.

According to an essential feature of the invention, each propeller 3 is associated to an electric motor 6 with a toroid geometry having an annular rotor R (see in particular FIG. 4) rotatable inside an annular stator S and defining therewithin a central aperture A into which there extend the blades 3A of propeller 3. In the embodiment shown in FIG. 3, three electric motors 6 are shown, i.e., a first electric motor, a second electric motor, and a third electric motor, which each have a corresponding propeller 3. As shown in FIG. 4, the toroid body of the electric motor 6 defined by the annular bodies of the rotor and the stator forms a tube guiding and directing the water flow affected by the propeller 3. The blades 3A of propeller 3 are radial blades each extending starting from the wall of the rotor R to a substantially pointed free end arranged at a distance from axis X of the propeller.

As shown in FIGS. 12A-12E, an important feature of the invention lies in that the shape of the blades (or of the single blade) of the propeller is such as to cause the water flow through aperture A to converge towards a focusing area P arranged at the rear of the propeller, with reference to the direction of movement of the vessel. In the case of the solution shown herein, there is provided a single blade, with the advantages which have been discussed above. However, a converging flow can be obtained also with propellers having more than one blade.

Studies and tests of the applicant have shown that the converging flow generated by the propeller produces an increase of the propulsion thrust with respect to the known solutions. The 3D geometry of each blade is selected so as to ensure maximum efficiency and maximum thrust by causing the flow to converge at a predetermined distance from the plane containing the rotor.

In the preferred embodiment, each of said one or more radial blades has a curved tip oriented towards said focusing area, the curvature and the 3D shape of the blade have been optimized to obtain the required degree of convergence.

Preferably, the distance between said focusing area P and the median plane Z (see FIG. 12) of the blade is 1.8-2.2 times the inner diameter of said guide tube at said median plane. The distance of the focusing area P from the median plane Z naturally depends from the density of the fluid and in particular for water is preferably 1.8-2.2 times the inner diameter of the tube. This is indeed the configuration which provides optimum results in terms of thrust obtained for a given motor power.

As already indicated in the foregoing, electric machines adapted to be made with the toroid configuration shown in FIG. 4 were already proposed and developed in the past for different applications.

Figure 11:
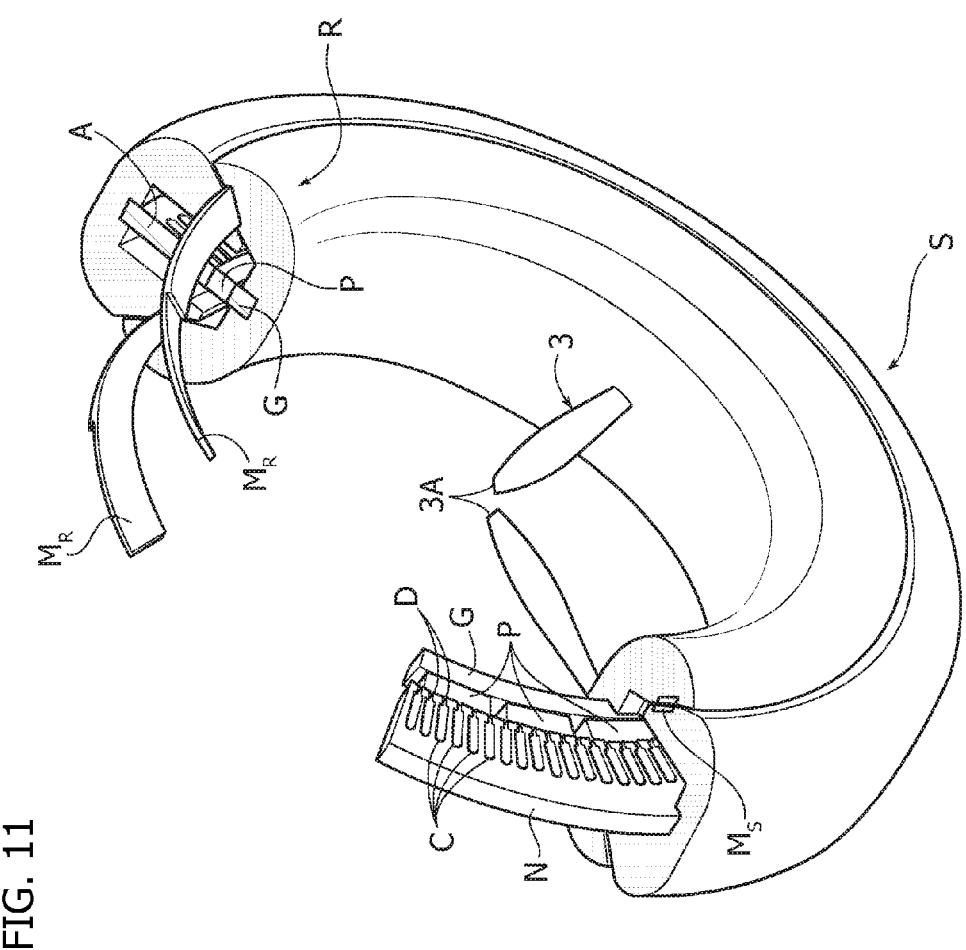
FIG. 11 is a perspective view partially in cross-section of an electric machine in according to the prior art, originally studied for operating as generator in association to a rotor driven by an air flow, which is instead used as a motor for driving the propeller of the system according to the invention, FIG. 12A show a cross-sectional view disclosing the configuration of the water flow generated by each propeller of the propulsion system according to the invention, with reference to the example in which the propeller comprises a single blade, FIG. 12B-12E respectively show a lateral view, a front view and two perspective views of the unit of FIG. 12 A.

FIG. 11 of the annexed drawings is taken from document EP 1 885 047 B1 and the corresponding document U.S. Pat. No. 7,592,712 B2 of the same inventor. In the case of these documents, the electric machine was used as an electric generator in association to a rotor rotated by wind power.

In FIG. 11, the body of stator S and the body of rotor R are illustrated in cross-section in order to show the components inside thereof. First of all, in the case of the embodiment shown in FIG. 11, rotor R is rotatably supported within stator S by means of magnetic sustenance, obtained through two pairs of annular permanent magnets $M_R$ and $M_S$. In FIG. 11, by N there is designated an annular core forming part of stator S, made of ferromagnetic material, such as SMC ("Soft Magnetic Composite"). Starting from the inner surface of annular core N there are formed slots C adapted to receive windings (not shown) associated with stator S and adapted to cooperate with permanent magnets carried by rotor R. By D there are designated teeth defined between each other slot C. Rotor R includes an annular core G, which also is made of ferromagnetic material, such as SMC. Rotor R further has a annular series of permanent magnets P arranged radially at the outside of core G, these magnets being arranged so as to provide an alternated arrangement of North-South magnetic poles which are to cooperate with the windings of stator S for generating a rotation of rotor R when electric current is passed through the windings. In one variant, the rotor can be constituted by a plurality of layers of magnetic composite material arranged so as to define an alternated arrangement of magnetic North-South poles. In another variant, rotor R can be constituted by a plurality of permanent magnets arranged according to a so-called "Halbach array" configuration, known per se, in order to reduce weight and dimensions of rotor R. From the inner surface of the body of rotor R there extend radial blades 3A of propeller 3.

As shown in the drawings, in the embodiment illustrated herein the blades 3A of each propeller 3 do not meet at the centre of the rotor, but remain instead spaced from each other, so as to leave a central part of the aperture A within the rotor free. It is however possible to provide for the blades 3A to join each other at the centre of aperture A.

In one embodiment, the toroid electric motor is made with windings and permanent magnets arranged only along a portion and, for example 70%, of the entire circumferential extension, so that at the remaining portion of the circumferential extension of the motor, the stator and the rotor can be made with a reduced dimension along the direction parallel to the axis of the motor, with the advantageous result of a lower hydrodynamic drag.

Naturally, although the above described electric motor is considered to be most adapted to be applied to the system according to the invention, it does not represent the only possible solution. From the stand point of efficiency purely, the electric machine with surface permanent magnets represents the best choice. However it also involves some drawbacks:

the motor with permanent magnets (PM) require special safety solutions for the power converter; in the case of a failure, the movement of the PM machine generates an electromotive force (emf) which must be properly handled in order to avoid further damages (such as to the battery) and further electric dangers;

machines purely of a PM type suffer for the poor availability of the main raw material, the neodynium-iron-boron for the magnets, whose production is for the most part in China and subject to restrictions, due to strategical and environment reasons.

Any other type of electric motor which has a toroid configuration similar to that described above can also be used. Induction electric machines have a lower efficiency but are produced on a large scale and exploit a consolidated and low-cost technology. A better compromise in terms of costs, efficiency and safety is represented by reluctance machines, both of the synchronous type and of the switched reluctance type.

Compared with conventional solutions, the axial flow machines have favourable features with respect to efficiency and specific torque. An axial-field electric motor comprises a rotatable rotor and generators/paths with multiple axial flows (permanent magnets, variable reluctance channels, squirrel-type cage elements) carried by the rotor. The axial flow generators are oriented so that the magnetic flow generated thereby is oriented axially at least for a substantial portion. The axial-flow generators are positioned around the rotor with an alternated orientation of the flow direction, so that the direction of flow of adjacent segments is oriented axially at least for a substantial portion, but in opposite directions. Axial-flow machines can be made with reduced or zero contents of rare earth elements and for this reason are of low cost.

Figure 5:
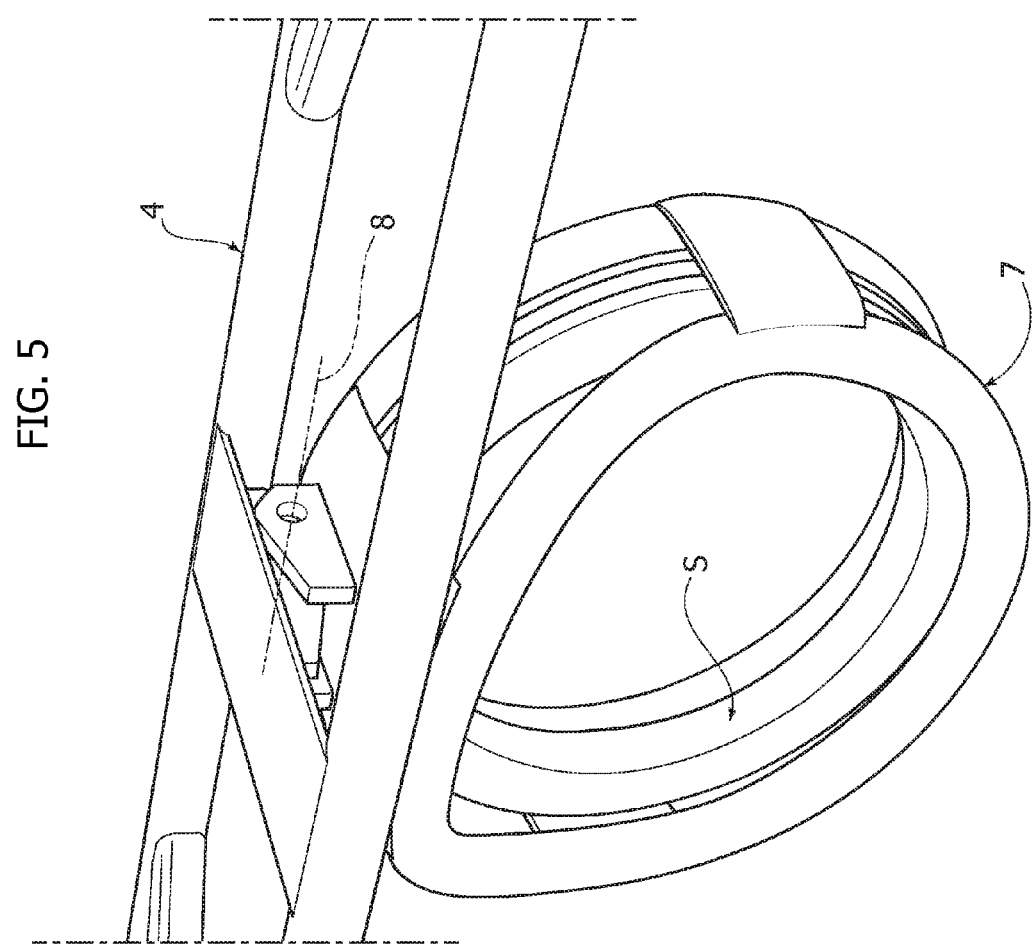
FIG. 5 is a perspective view similar to that of FIG. 4, in which the propellers and the outer housing of the motor driving the propeller have been removed, in order to show the supporting frame, with the toroid electric motor associated therewith.
Figure 8:
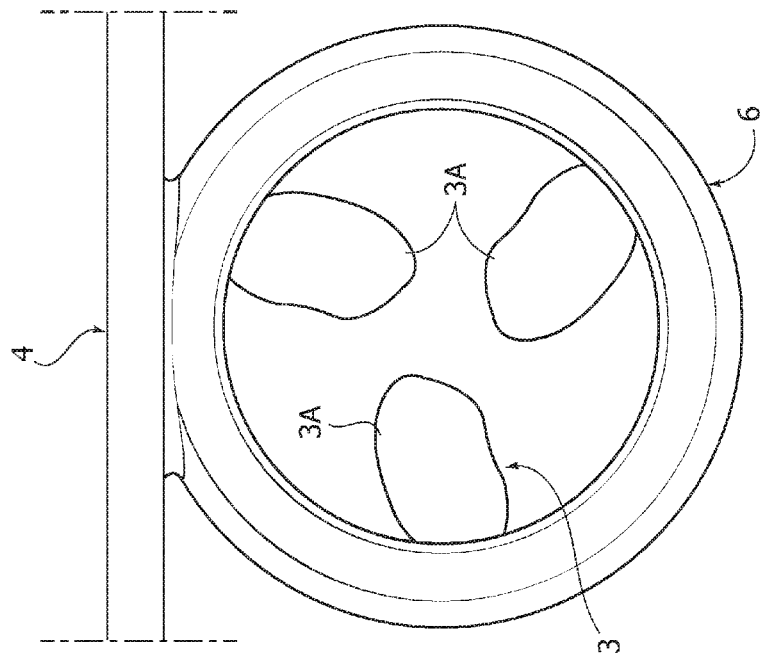
FIGS. 7, 8 are a cross-sectional view and a front view of a single motor, with the propeller associated thereto, in a neutral adjustment position, FIG. 9, 10 are views in cross-section similar to that of FIG. 7, which show the motor unit with the associated propeller in two end positions of the movement for adjustment of the unit inclination.

As shown in FIG. 5, the body of the stator is mounted within a frame 7 forming part of the supporting structure 4.

In one embodiment, the frame 7 which supports each propeller 3 is mounted so that it can be independently oscillate around a horizontal transverse axis 8 on the supporting structure 4. Alternatively, a solution of the type shown in FIG. 3 may be provided, in which the entire supporting frame 4 is pivotally mounted around a horizontal transverse axis 9 on the auxiliary structure 10 which is provided with means for anchoring to the transom wall 5. In both cases, there are provided actuating means for adjusting the inclination of the propellers around a horizontal axis, transverse with respect to the direction of movement of the vessel. In the case of the embodiment shown in FIG. 3, this is obtained by an actuating cylinder 11 carried by the auxiliary structure 10 and driving a crank 12 carried by a shaft 13 carrying the supporting structure 4 and rotatably mounted around the transverse axis 9 on the auxiliary structure 10.

Preferably, actuator 11 is an electric powered actuator, which is controlled by an electronic control unit on the basis of output signals from an attitude sensor, preferably of the inertial type, which detects the attitude of the vessel and corrects the inclination of the propellers 3 so as to keep the direction of the thrust parallel to the horizontal direction of movement of the vessel. Alternatively, the sensor may be an accelerometer or an inclinometer developed preferably according to MEMS (Micro Electro Mechanical Sensor) technology.

The electric motors 6 are supplied by cables (not shown in the drawings) associated to the supporting frame 4 and connected to supply electric batteries provided within a containing compartments. In the case of the illustrated example, this compartment is provided at the stern of the vessel and is closed by a lid (see FIG. 1).

With reference to FIG. 2, vessel 2 is preferably provided with a foldable panel 15 carrying an array of photovoltaic cells 16, which can be deployed in a roof fashion above the vessel 2, by means of a supporting frame 17. The energy generated by the photovoltaic cells 16 is used to recharge the supply batteries of the electric motors 6.

Figure 7:
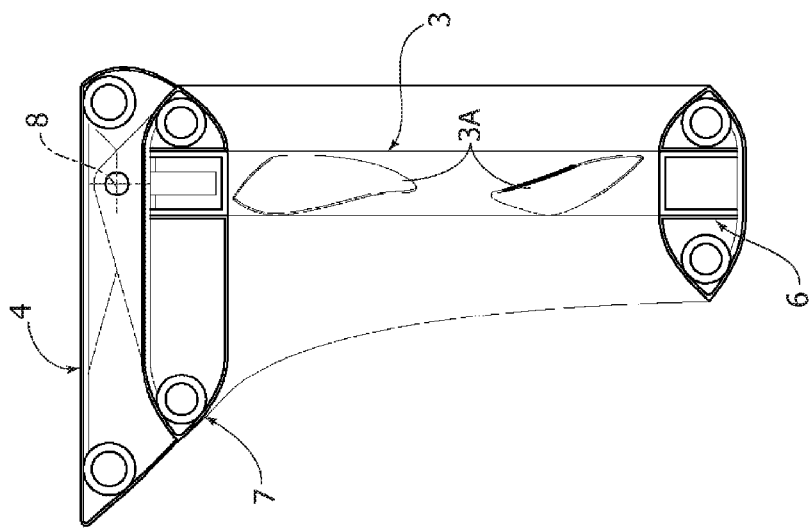

FIG. 7 shows a propeller 3 in cross-section, according to the variant of FIGS. 4-6, where the supporting frame of each propeller is independently articulated to the supporting structure 4 around the transverse axis 8. FIGS. 9, 10 show two end positions of the movement for adjusting the inclination of propeller 3 around the transverse axis 8. In the illustrated actual case, the maximum inclination upwardly is 10°, whereas the maximum inclination downwardly is 5°.

According to a further feature, an electronic control unit is provided adapted to control in a differentiated manner at least two motors which are arranged at the two sides of the median axis of the vessel, to control the direction of movement of the vessel, with no need of a helm.

The propellers are adapted to be rotated by a flow of water so that the respective electric motors can be used as generators for recharging the supply batteries. These batteries may be recharged also through an inverter AC/DC and supply cable connected to the electric supply (AC recharge) or by means of a DC-DC converter and other batteries (DC recharge) according to solutions which are known in the field of electric vehicles.

As already indicated above, according to a further embodiment, which however does not form the subject of the annexed claims, a propulsion unit of the above described type can be also provided for aerial propulsion of small unmanned aircrafts of the VTOL type which can be used for example as drones for surveillance activities, with the aid of cameras or video cameras, or for conveying small payloads. A vehicle of this type can be provided for example with three or more propulsion units with vertical axes arranged around a central supporting structure, which for example can house an onboard electronic unit and transmitting/receiving means of communication with a control station. The configuration of each propulsion unit is identical to that described above for the outboard propulsion device, with the difference that in this case the best configuration of the blades of the propeller is that which causes the air flow through each rotor to converge into a focusing area located at a distance of about 2.8-3.2 times the inner diameter of the rotor. Due to this feature, an aerial propulsion unit according to the invention has a greater efficiency and provides a greater lift with respect to convention solutions in the field of propulsion units for VTOL aircrafts.

Figure 13A:
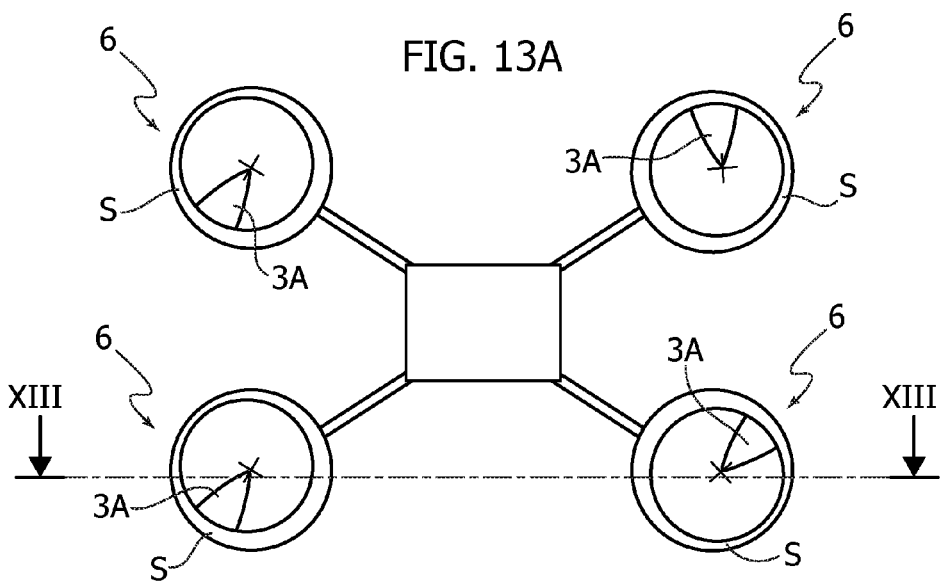
FIG. 13A shows a further application of the concepts which are at the basis of the present invention.
Figure 13B:
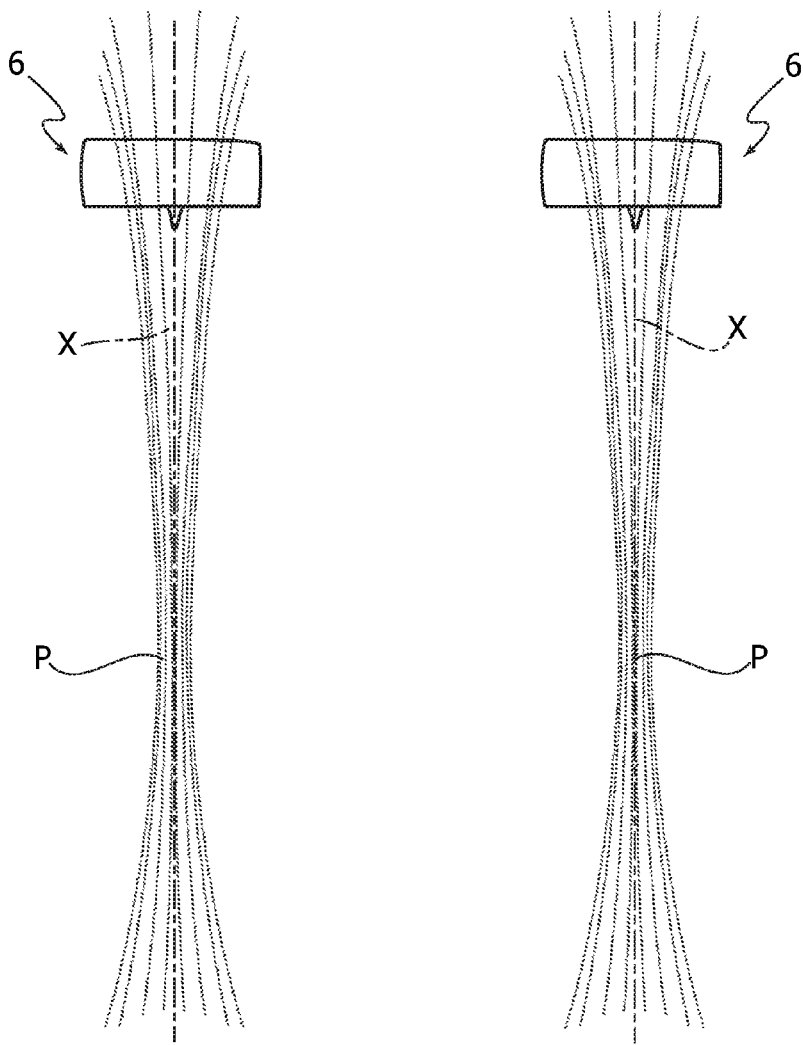
FIG. 13B shows a cross-section taken along line XIII of FIG. 13A.

FIG. 13A of the annexed drawings shows a small unmanned aircraft. Purely by a way of example, the space covered in plan view by this vehicle may be a square with a side having a length between 5 cm and 50 cm. A central supporting structure carries a plurality of (for example four) propeller units 6 arranged therearound, whose structure and configuration corresponds for example to that shown in the foregoing description. This applies both to the shape of the blade (with the difference that the focusing distance of the flow is preferably that indicated above of 2.8-3.2 times the inner diameter of the rotor) and to the configuration of each electric motor.

This embodiment relates therefore to the following characteristics:

A) A VTOL aircraft, comprising a central supporting structure carrying a plurality of aerial propeller units arranged around it and mainly characterized in that:
each propeller (3) is associated to an electric motor (6) having a toroid configuration, with an annular rotor (R) rotatable within an annular stator (S) and on its turn defining therewithin a central aperture (A), said propeller (3) having one or more blades (3A) which are carried by the rotor (R) and extend into said central aperture (A),
the annular body of the rotor (R) and the annular body of the stator (S) define a guide tube for the airflow affected by the propeller (3),
said one or more blades (3A) are radial blades each extending into said central aperture (A), starting from a wall of the rotor (R) and ending at a blade free end arranged at a distance from the central axis of the propeller and,
the configuration of said one or more blades (3A) is such as to cause the airflow through said central aperture (A) to converge towards a focusing area (P).

B) According to a further preferred feature, the aircraft is further characterized in that the distance between said focusing area and the median plane of each propeller (3) is 2.8-3.2 times the inner diameter of said guide tube at said median plane.

C) Independently from the value of the focusing distance, according to a further preferred feature, said aircraft according to feature A) or B) is further characterized in that each propeller (3) comprises a single radial blade.

D) Independently from the number of blades of each propeller, the aircraft according to any of features A, B or C is further characterized in that each blade preferably has a curved tip which is oriented towards the focusing area (P).

Naturally, while the principle of the invention remains the same, the details of construction and the embodiments may widely vary with respect to what has been described and illustrated purely by way of example, without departing from the scope of the present invention.

The invention claimed is:

1. An outboard propulsion system for a vessel having a forward direction of movement and a transom wall, the propulsion system comprising:
a supporting structure anchored to the transom wall of the vessel;
one or more electric motors supported by the support structure and having a toroid configuration, each of the one or more electric motors having an annular stator and an annular rotor rotatable within the annular stator, the annular rotor of each of the one or more electric motors encircling a central aperture;
one or more propellers with each of the one or more propellers being separately engaged with a corresponding one of the one or more electric motors, each of the one or more propellers having a central axis and one or more radial blades that are carried by the annular rotor of the corresponding one of the one or more electric motors and extend into the central aperture thereof, each of the one or more radial blades starting from a wall of the annular rotor and ending at a blade free end which is located at a distance from the central axis; wherein the annular rotor and the annular stator of each of the one or more electric motors forms a guide tube through which a flow of water passes when the one or more electric motors are disposed within water and the one or more propellers are activated, the flow of water passing from in rear of to in front of each of the one or more propellers as the flow of water passes through the guide tube of each of the one or more electric motors, and
wherein the flow of water through the guide tube of each of the one or more electric motors converges towards a focusing area located in a rear of each of the one or more propellers.

2. The outboard propulsion system according to claim 1, wherein the distance between the focusing area and a median plane of each of the one or more propellers is 1.8-2.2 times the inner diameter of the guide tube of each of the one or more electric motors at the median plane.

3. The outboard propulsion system according to claim 1, wherein each of the one or more propellers comprises a single radial blade.

4. The outboard propulsion system according to claim 1, wherein each of the one or more radial blades has a curved tip oriented towards the focusing area.

5. The outboard propulsion system according to claim 1, further comprising:
the supporting structure being pivotally mounted around a horizontal axis that is transverse with respect to the forward direction of movement of the vehicle; and
an electric actuator adjusting a position of the supporting structure around the transverse axis so as to keep a direction of thrust produced by the one or more propellers when operating in water substantially parallel to a horizontal vector of the forward direction of movement of the vessel.

6. The outboard propulsion system according to claim 5, further comprising an electronic control unit that drives the electric actuator on the basis of an output signal from a sensor detecting an attitude of the vessel when the vessel is moving.

7. The outboard propulsion system according to claim 1, further comprising an electronic control unit controlling a first electric motor of the one or more electric motors disposed on one side of a median axis of the vessel and a second electric motor of the one or more electric motors disposed on an opposing side of the median axis of the vessel, the electronic control unit controlling the first electric motor and the second electric motor for controlling the direction of movement of the vessel.

8. The outboard propulsion system according to claim 1, further comprising:
the annular stator of each of the one or more electric motors including an annular core of ferromagnetic material having an alternated arrangement of slots and teeth for receiving stator windings, and
the annular rotor of each of the one or more electric motors having an annular core of ferromagnetic material and an annular arrangement of permanent magnets arranged radially at the outside of the annular core so as to define a plurality of North-South magnetic poles that cooperate with the windings of the annular stator.

9. The outboard propulsion system according to claim 8, wherein each of the one or more electric motors having a toroid configuration is provided with an active portion constituted by windings and permanent magnets arranged only along a portion of an entire circumferential extension of the one or more electric motors.

10. The outboard propulsion system according to claim 1, further comprising:
batteries in communication with the one or more electric motors; and
a foldable panel above the vessel and which carries an array of photovoltaic cells, the photovoltaic cells being in electrical communication with the batteries.

11. The outboard propulsion system according to claim 1, wherein each of the one or more propellers is rotatable by a flow of water, so that the one or more electric motors are generators for recharging batteries.

12. The outboard propulsion system according to claim 1, further comprising:
supply batteries in electrical communication with the one or more electric motors; and
an AC/DC inverter in electrical communication with the supply batteries.

13. The outboard propulsion system according to claim 1, further comprising:
supply batteries in electrical communication with the one or more electric motors; and
a DC/DC converter and other batteries connected to the DC/DC converter in electrical communication with the supply batteries.

* * * * *